(12) United States Patent
Kimura et al.

(10) Patent No.: US 8,457,149 B2
(45) Date of Patent: Jun. 4, 2013

(54) DATA PROCESSING APPARATUS, CONTROL METHOD THEREFOR AND STORAGE MEDIUM

(75) Inventors: Takeo Kimura, Yokohama (JP); Hisashi Ishikawa, Urayasu (JP)

(73) Assignee: Canon Kabushiki Kaisha, Tokyo (JP)

(*) Notice: Subject to any disclaimer, the term of this patent is extended or adjusted under 35 U.S.C. 154(b) by 439 days.

(21) Appl. No.: 12/729,633

(22) Filed: Mar. 23, 2010

(65) Prior Publication Data

US 2010/0293310 A1     Nov. 18, 2010

(30) Foreign Application Priority Data

May 14, 2009   (JP) ................................. 2009-118043

(51) Int. Cl.
*H04L 12/42*  (2006.01)
*H04J 3/02*   (2006.01)
*H04J 3/06*   (2006.01)

(52) U.S. Cl.
USPC ............................ 370/452; 370/462; 370/503

(58) Field of Classification Search
None
See application file for complete search history.

(56) References Cited

U.S. PATENT DOCUMENTS

| | | | | |
|---|---|---|---|---|
| 6,005,869 A | * | 12/1999 | Sakai et al. | 370/452 |
| 6,526,452 B1 | * | 2/2003 | Petersen et al. | 709/251 |
| 7,499,468 B2 | * | 3/2009 | Montgomery, Jr. | 370/453 |
| 2010/0169269 A1 | * | 7/2010 | Chandrasekaran | 707/608 |

FOREIGN PATENT DOCUMENTS

JP     1-023340 A     1/1989

OTHER PUBLICATIONS

IEEE standard 802.5 (1998 edition).

* cited by examiner

*Primary Examiner* — Jutai Kao
(74) *Attorney, Agent, or Firm* — Fitzpatrick, Cella, Harper & Scinto

(57) ABSTRACT

A data processing unit to that reliably avoids a deadlock condition regardless of status of a ring bus occupied with normal data packets. The data processing unit comprises ring bus, a plurality of data processing units connected to the ring bus, for mutually performing data exchange using a packet circulated on the ring bus and a injection unit for injecting a special packet distinguished from the packet on the ring bus so as to circulate the special packet on the ring bus, wherein the plurality of data processing units respectively comprise for confirming whether or not a transmission destination data processing unit of the data is capable of receiving data by using the special packet, and a transmission unit for transmitting the data to the transmission destination data processing unit using the special packet.

6 Claims, 11 Drawing Sheets

FIG. 6

| TYPE | | V | S | COUNT | Node ID | EXPLANATION |
|---|---|---|---|---|---|---|
| NORMAL PACKET | | 1 | 0 | 1 OR HIGHER | 1 OR HIGHER | PACKET IN DATA TRANSFER |
| | | 1 | 1 | 1 OR HIGHER | 1 OR HIGHER | PACKET IN DATA TRANSFER(STALLED) |
| | | 0 | 0 | ARBITRARY | ARBITRARY | EMPTY PACKET |
| SPECIAL PACKET | | 0 | 1 | 0 | 1 OR HIGHER | DATA TRANSFER PACKET |
| | | 0 | 1 | ARBITRARY | 0 | EMPTY PACKET |
| | | 0 | 1 | 1 OR HIGHER | 1 OR HIGHER | INQUIRY PACKET |

601

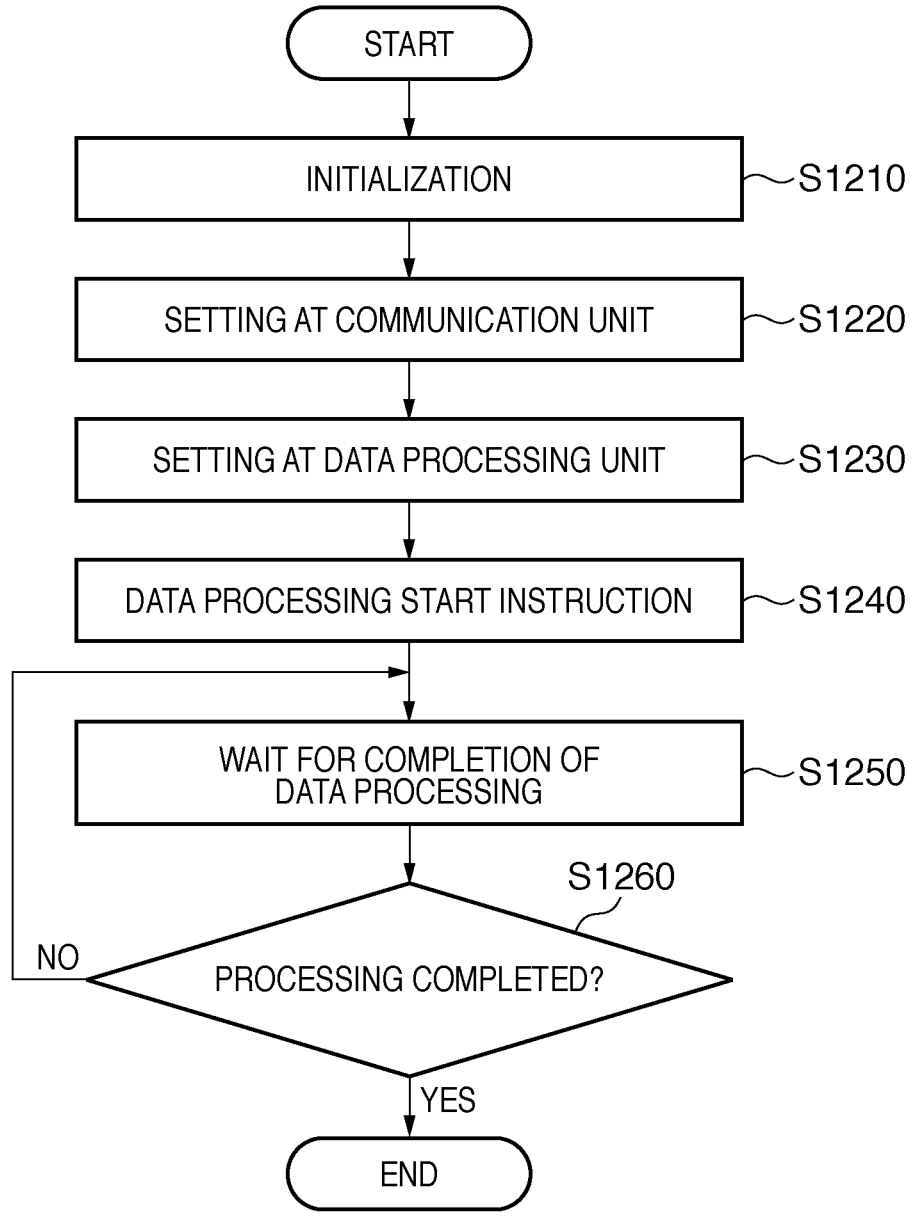

DATA PROCESSING APPARATUS, CONTROL METHOD THEREFOR AND STORAGE MEDIUM

BACKGROUND OF THE INVENTION

1. Field of the Invention

The present invention relates to an information processing system to realize highly reliable data processing by control of data flow to a plurality of data processing units.

2. Description of the Related Art

Conventionally, a method of dividing entire data processes into predetermined functions as hardware processes, and performing the series of data processes as pipe-line processes by connecting the hardware modules in the order of the process flow to realize a series of data processing such as print image processing quickly and efficiently, is known.

On the other hand, image processing can be efficiently realized by changing the order of series of processing. For example, when an image is output to an output device having a predetermined number of pixels, resolution conversion is required for coordination of number of pixels or resolution. When the number of pixels of an input image is larger than that of the output device, it is better to perform resolution conversion on the upstream side of the processing to reduce the number of pixels and then perform the processing. However, when the number of pixels of the input image is smaller than that of the output device, it is better to perform the processing without resolution conversion, on the image with the small number of pixels, and then perform the resolution conversion immediately before output on the downstream side of the processing.

Further, for example, in a case where conversion from certain space (e.g. input device space) to standard space (e.g. resolution 600 dpi CIELAB color space) is performed then processing is performed to convert the space to another space (e.g. output device space), the processing order of space converters on the input side and the output side (the processing order of one-dimensional LUT, matrix operation, three-dimensional LUT and the like) is inverted. That is, when the processing order can be changed, the same processing module can be shared on the input and output sides. However, in the above-described data processing method, the processing order cannot be changed. Accordingly, for example, as plural modules having the same function are provided so as to change the processing order, wasteful modules exist.

To solve the above-described problem, Japanese Patent Laid-Open No. 01-023340 proposes a method of connecting respective processing modules with a ring-shaped network. According to this method, by changing data connection destination on the ring network, the processing order can be changed.

Further, "dead lock" means a condition where input into processing modules cannot be performed and the ring bus is occupied with data packets. Japanese Patent Laid-Open No. 01-023340 proposes providing a queue to temporarily hold data packets in this dead lock condition. That is, first, empty space is temporarily ensured on the ring bus after the occurrence of dead rock condition. Then, by enabling transmission of a data packet which can be inputted into a processing module which has been hindered by the bus occupation, processing on the ring bus can be continued.

However, in the above-described conventional method, there is an upper limit in the length (amount) of the queue temporarily validated in the dead lock condition. Accordingly, although the dead lock condition can be avoided regarding such assumed occupation status, another occupation status beyond assumption that continues after the temporary queue validation may occur. At this time, even though a temporary queue is used, a data packet that cannot be inputted module into a processing at some future time may occur. In such case, the unprocessed data packet occupies the ring bus and a dead lock condition occurs again. Further, in this case, as it is necessary to prepare a temporary queue having a constant amount to avoid a dead lock condition, the circuitry scale of a data processing unit is unnecessarily increased.

SUMMARY OF THE INVENTION

The present invention has been made so as to solve the above-described problems, and provides a technique for avoiding a dead lock condition on a ring bus.

The present invention provides a data processing unit comprises a ring bus, a plurality of data processing units connected to the ring bus, for mutually performing data exchange using a packet circulated on the ring bus and a injection unit for injecting a special packet distinguished from the packet onto the ring bus so as to circulate the special packet on the ring bus, and wherein the plurality of data processing units respectively comprise a confirming unit for confirming whether or not a transmission destination data processing unit of the data is capable of receiving data by using the special packet when the special packet in an empty status is obtained upon data transmission, and a transmission unit for transmitting the data to the transmission destination data processing unit using the special packet when the confirming unit determines that the transmission destination data processing unit of the data is capable of receiving data.

In accordance with the present invention having the above structure, no matter how the ring bus is occupied with normal data packets, a dead lock condition can be infallibly avoided.

Further features of the present invention will become apparent from the following description of exemplary embodiments with reference to the attached drawings.

BRIEF DESCRIPTION OF THE DRAWINGS

FIG. 6 is a table showing an example of classification of packets flowing on the ring bus;

FIG. 11 is a flowchart showing a control procedure of the data processing unit.

DESCRIPTION OF THE EMBODIMENTS

Here in below, an embodiment of the present invention will be described. Note that the following embodiment is provided for assistance of implementation by those skilled in the art in the technical field of the present invention, and included as a part of embodiments in the technical scope of the present invention defined in claims. Accordingly, it is apparent for those skilled in the art that as long as the technical idea is the same, even an embodiment not directly described in the present specification is included in the technical scope of the present invention.

Next, an embodiment 1 will be described in detail in accordance with the accompanying drawings.

Figure 1:
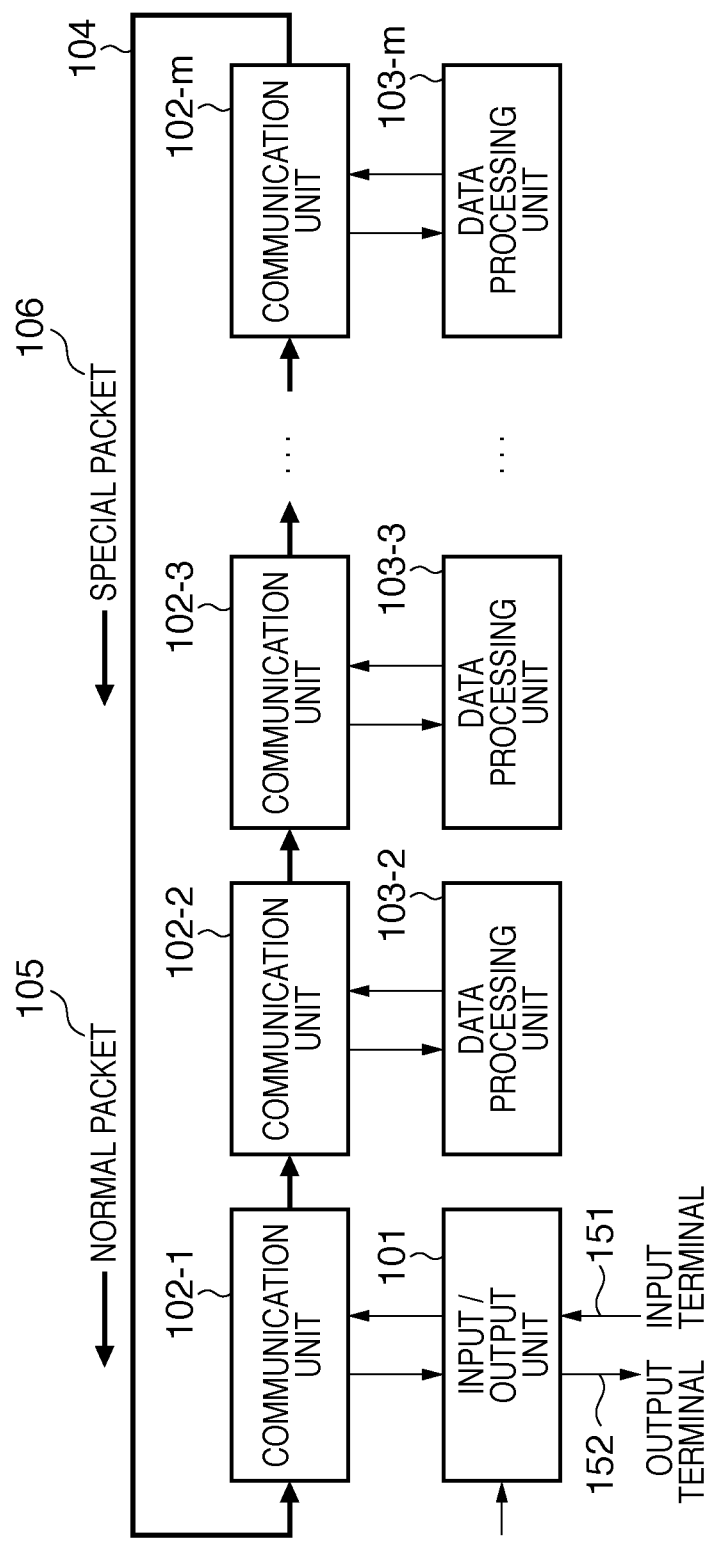
FIG. 1 is a block diagram showing a configuration of a data processing unit.

FIG. 1 is a block diagram showing a configuration of a data processing unit according to an embodiment 1 of the present invention. In this figure, a data input/output unit 101 is connected to a communication unit 102-1, and respective m−1 communication units 102-2 to 102-m are connected to data processing units 103-2 to 103-m. Further, m communication units 102-1 to 102-m are respectively connected to the adjacent communication units via a ring bus 104 for mutual data exchange. In FIG. 1, the ring bus is constructed by connecting the right end communication unit 102-m to the left end communication unit 102-1. That is, the communication units 102-1 to 102-m construct the ring bus 104, and perform data exchange between the ring bus and the data input/output units or the data processing units. A normal packet 105 is circulated on the ring bus 104, thereby processed by the respective data processing units 103-2 to 103-m in a predetermined order. Further, at least one special packet 106 is injected on the ring bus 104. The injection of the special packet enables generation of an inquiry packet and a special data transfer packet to be described later.

Data input from an input terminal 151 is inputted via the data input/output unit 101 into the communication unit 102-1. The input data is packetized and outputted onto the ring bus. The communication units 102-1 to 102-m input a necessary packet from the ring bus in accordance with previously-set information. Then, the communication units 102-1 to 102-m extract data from the input packet, and input the extracted data into the data processing unit 103. The data processing unit 103 performs predetermined data processing (for example, color space conversion or resolution conversion), and outputs the processed data to the communication unit 102. The processed data is turned into packet form by the communication unit 102 and output onto the ring bus.

In this manner, data is passed by the communication units 102 to 102-m to the data processing units 103-2 to 103-m in a predetermined order and sequentially processed. Then, data subjected to the previously-set data processing is inputted by the communication unit 102-1 into the data input/output unit 101 and outputted from an output terminal 152. Note that the data input/output unit 101 performs interface with respect to an external device (or module). The data input/output unit 101 can be omitted when direct interface can be realized by the communication unit 102-1. Note that the ring bus in FIG. 1 can be considered as a token ring bus in a network based on the IEEE 802.5 standard (LAN). In this case, the respective communication units 102-1 to 102-m have a node corresponding to a node ID to be described later. Then, in the token ring, the special packet described here can be applied.

Figure 2:
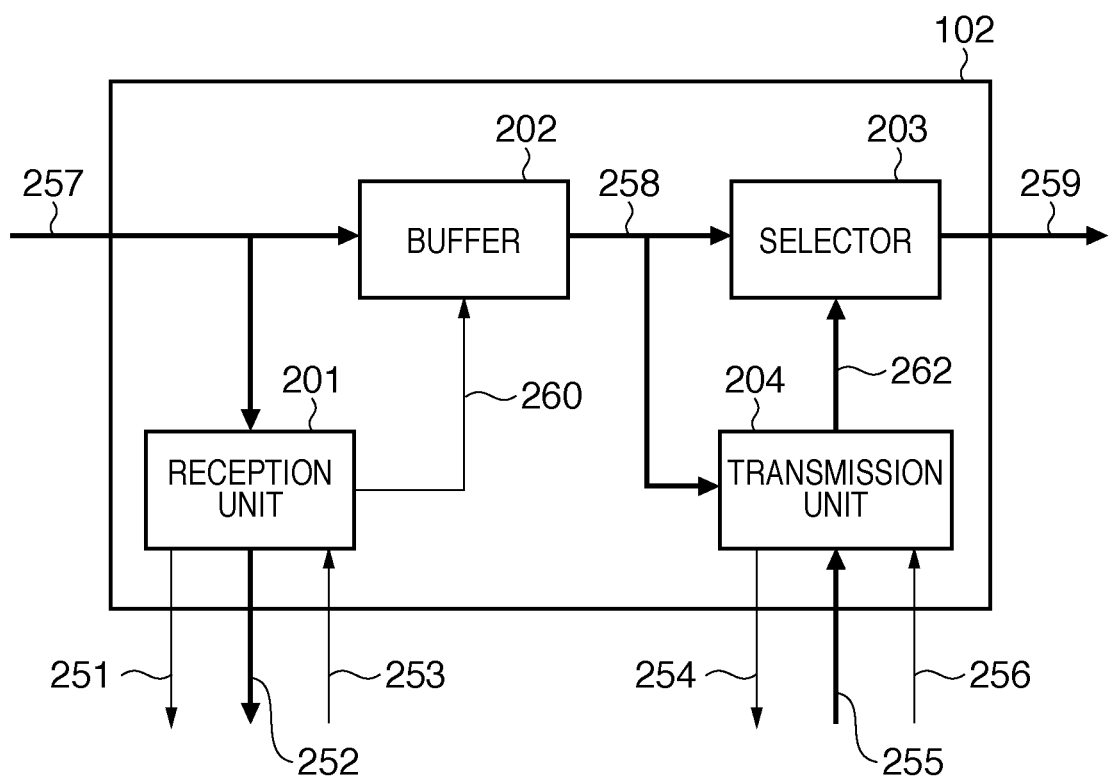
FIG. 2 is a block diagram showing a configuration of a communication unit.

FIG. 2 is a block diagram showing a configuration of the communication unit 102. The communication unit, having a controller using a CPU (not shown) or the like, comprehensively controls operations of respective functional units described below. In this figure, a reception unit 201 receives a packet on the ring bus, a buffer 202 temporarily holds the received data, a selector 203 selects data from a transmission unit 204 or the data from the buffer 202 and transmits the data onto the ring bus, and the transmission unit 204 performs processing for transmission of the data from the buffer 202 or the processing unit.

An output terminal 259 of a previous communication unit is connected to an input terminal 257 of the present communication unit, and as a result, the ring bus is constructed with the communication units 102-1 to 102-m. Further, signal lines 251 to 256 are connected to the data processing unit 103 (one of the data processing units 103-2 to 103-m).

Figure 5:
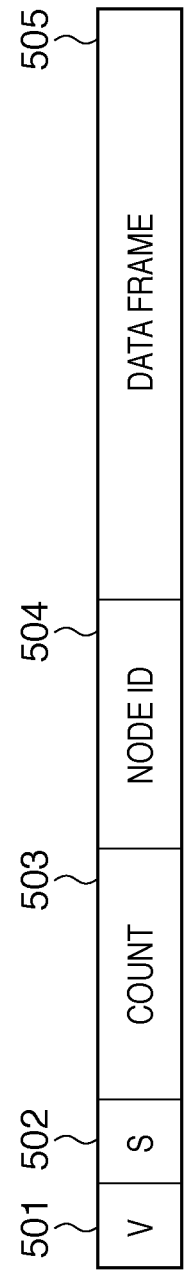
FIG. 5 illustrates a structure of a packet flowing on a ring bus.

FIG. 5 shows a form of a data packet (hereinbelow, a "packet") flowing on the ring bus. In this figure, a VALID flag 501, a stall flag 502, a count 503 and a node ID 504 form a packet header. The VALID flag 501 indicates validity of the packet. When the VALID flag 501 is set to "1", it indicates "valid", while the flag is cleared to "0", it indicates "invalid". The stall flag 502 indicates whether or not the packet is in a reception-stalled state. When the stall flag 502 is set to "1", it indicates "stalled", while when the flag is cleared to "0", it indicates "unstalled". The count 503 is a count value indicating a data transmission order. At normal times, the value equal to or higher than "1" is a valid value. The node ID 504 is a connection node ID for identification of logical data connection. At normal times, the value equal to or higher than "1" is a valid value. Further, a data frame 505 is data inputted or outputted into the communication unit.

As initial values of the respective flags of the packet, the initial value of the VALID flag 501 is "0" (invalid), the initial value of the stall flag 502 is "0 (unstalled)", the initial value of the count 503 is "0", and the initial value of the node ID 504 is "0". This generally means an empty packet (empty normal packet).

A special empty packet (empty special packet) can be realized by setting the stall flag 502 upon initialization for distinction from a normal empty packet for use on the ring bus. Note that selection of a packet in processing as a special packet, or whether or not plural special packets are prepared, is not important. Further, the number of special packets can be increased or decreased in mid course. For example, it may be arranged such that 0 special packet is provided at first and the number of special packets is increased in accordance with necessity, otherwise, the special packet(s) are temporarily decreased to 0 when unnecessary during operation. However, unless such increase/decrease control is possible to assure the existence of at least one special packet when necessary, it is preferable to circulate one or more special packets on the ring bus avoiding a status where 0 special packet is provided at first.

In FIG. 2, a packet inputted through the input terminal 257 from a communication unit that previously performed processing is temporarily held in the buffer 202, then outputted to the selector 203 in the next clock cycle. At the same time, the reception unit 201 monitors the packet at the input terminal 257. Then, when a valid normal packet in data transfer where the VALID flag 501 indicates "valid" is established, the reception unit 201 validates the valid signal 251 and outputs the data from an output line 252 to the data processing unit 103. Further, when a condition for reception of a special packet in data transfer where the VALID flag 501 indicates "invalid", the stall flag 502, "stalled", the value of the count 503, "0", is established, the packet is inputted, then the valid signal 251 is validated, and similarly the data is outputted to the data processing unit 103. At this time, the CPU of the communication unit notifies the buffer 202 of data input via a signal line 260, clears the VALID flag 501 of the normal packet stored in the buffer 202 or clears the node ID 504 of the special packet to "0" thereby invalidates (empty-packetizes) the packet.

On the other hand, when the condition for reception of the normal packet in data transfer is not established, the CPU of the communication unit notifies the buffer 202 of data stalled status via the signal line 260, and sets the stall flag 502 of the packet stored in the buffer 202. Note that as data transfer with a special packet is performed after confirmation of receivable status in processing to be described later, reception is always assured.

Figure 7:
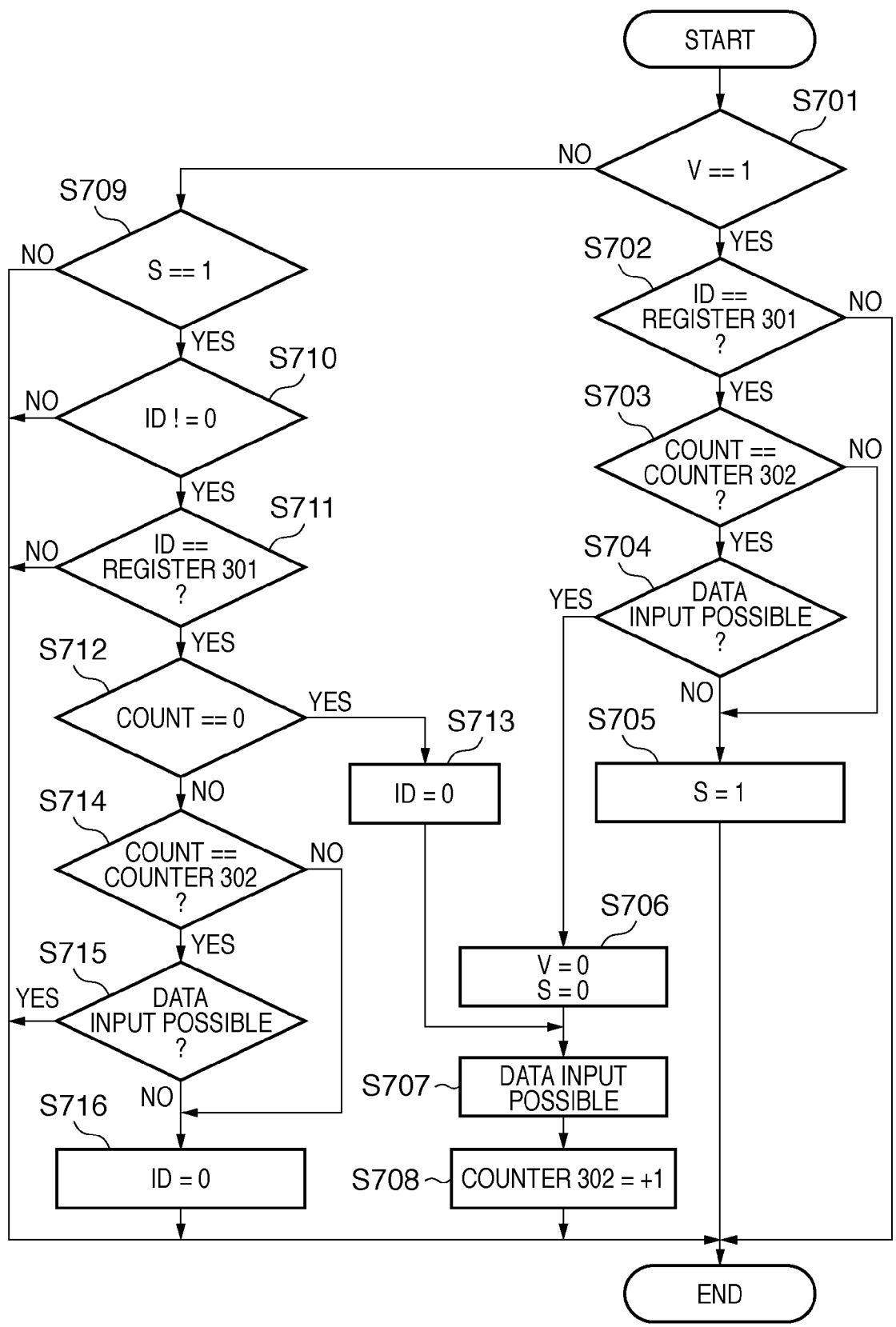
FIG. 7 is a flowchart showing an operation procedure of the reception unit.

Further, in a case where the reception unit 201 has detected that an inquiry packet about receivability using a special packet (the VALID flag 501 indicates "invalid", the stall flag 502 indicates "stalled", the value of the count 503 is equal to or higher than "1", the value of the node ID 504 is equal to or higher than "1") is sent for its processing module, when a reception condition is established, to notify that the reception is possible, the inquiry packet is not changed (step S715 in FIG. 7), while the reception condition is not established, the inquiry packet is invalidated (see step S716 in FIG. 7). Since the invalidated inquiry packet about receivability becomes a special empty packet, it is re-used as an inquiry packet about receivability of its processing module or an inquiry packet about receivability of another processing module (see step S815 in FIG. 8). The transmission unit 204 monitors a signal line 258 for an output packet in the buffer 202. When the packet is in data transfer, as the data cannot be outputted onto the ring bus, to stall data output from the connected data processing unit 103, a stall signal 254 is set. On the other hand, when the packet is empty and data output condition from the connected data processing unit 103 is established, the stall signal 254 is reset. Then a packet for data output (data transfer packet) is generated, and the selector 203 is controlled so as to output the generated data transfer packet from the output terminal 259 onto the ring bus.

Note that when a special packet is used so as to avoid packet transmission/reception deadlock condition, an inquiry is made by using a special packet about infallible reception of data to be processed next by a transmission destination (next processing module) on the ring bus.

Accordingly, when the empty packet is a special packet, the transmission unit 204 generates a special inquiry packet about receivability regarding data processed next in place of data output packet, and outputs the packet on the ring bus. Then, when the CPU of the communication unit detects that the inquiry packet about receivability transmitted from the transmission unit 204 has been circulated on the ring bus and returned to its processing module, determines that the returned packet is a response indicating receivability, generates a special data transfer packet for reception-assured data and performs data transfer. Note that it is necessary to confirm using the count 503 that the data used in the inquiry has not been already sent as another packet (i.e., the count value has not been incremented) before the special data transfer packet is transferred.

In the special data transfer packet, for distinction from a special inquiry packet of the same type, the value of the count 503 is set to "0" not used in the special inquiry packet. At this time, even though the count 503 as a process number is "0", transmission can be performed with no problem since the module in the next processing has been already confirmed with the inquiry packet. Further, distinction as to whether the data transfer packet is a special packet or normal packet can be made by combination between the values of the VALID flag 501 and the stall flag 502. Accordingly, as all the data transfer packets can be invalidated after data input and regenerated as empty packets of their respective types, disappearance of special packet (a status where no special packet exists) can be prevented.

FIG. 6 is a table showing classification of the types of valid packets flowing on the above-described ring bus. By combination of the VALID flag 501 (V), the stall flag 502 (S), the count 503 (COUNT) and the node ID 504 (node ID), denoted by a numeral 601, distinction between a normal packet and a special packet can be made. From this table, three types of normal packets and three types of special packets, i.e. six types of packets, can be identified. These packets are selectively used in correspondence with situation.

[Operation Flow]

Hereinbelow, the configuration and operation flow of the reception unit 201 will be described using FIG. 3 and FIG. 7. Further, the configuration and operation flow of the transmission unit 204 will be described using FIG. 4 and FIG. 8. The present embodiment is characterized by processing flow upon reception of a special packet 106 on the ring bus performed by a processing module that has processed data at normal times. In a case where a transmission originator processing module can send data already processed by its processing unit to a transmission destination, when the special packet 106 which is an empty packet has been received, a special inquiry packet is generated utilizing the empty packet 106, and the generated inquiry packet is transmitted via the ring bus to the transmission destination processing module. Further, in a case where the transmission destination processing module receives a special inquiry packet, when data can be acceptable, the special inquiry packet is returned without any processing onto the ring bus. When the transmission originator processing module receives the special inquiry packet sent from the processing module itself from the ring bus, it determines that the transmission destination processing module can receive data. When the transmission unit of the transmission originator processing module has not transmitted the data with a normal packet to the transmission destination processing module yet, the special inquiry packet is re-generated as a special data transfer packet and the data is transmitted onto the ring bus. On the other hand, when the transmission destination processing module that has received the special inquiry packet cannot accept the data, the received special inquiry packet is re-generated as a special empty packet and transmitted onto the ring bus.

The processing flow regarding the special packet has been briefly described as above.

Figure 3:
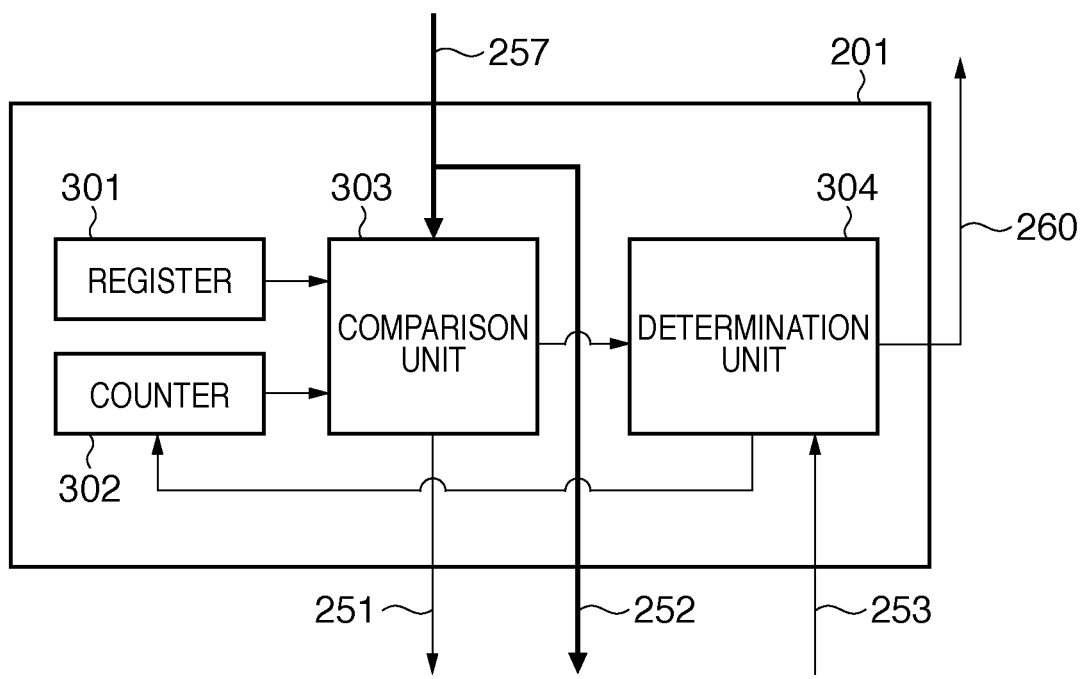
FIG. 3 is a block diagram showing a configuration of a reception unit.

FIG. 3 is a block diagram showing a configuration of the reception unit 201. In this figure, a register 301 indicates its node ID, and a counter 302, a processing number. A comparison unit 303 compares an input packet with outputs from the register 301 and the counter 302. A determination unit 304 determines whether or not the input packet is a packet for processing in its processing module.

FIG. 7 is a flowchart showing an operation procedure of the reception unit 201. Next, the flow of processing will be described in accordance with the steps of the flowchart.

The comparison unit 303 monitors the VALID flag 501, the stall flag 502, the count 503 and the node ID 504 of a packet on the ring bus inputted from the input terminal 257. Then at step S701, the reception unit 201 detects that the VALID flag 501 of the packet indicates "valid", and at step S702, the determination unit 304 determines that the node ID 504 of the packet matches a node ID stored in its register 301.

At step S703, the determination unit 304 determines that the value of the count 503 of the packet matches the value of the counter 302. Note that when the reception unit 201 detects that the VALID flag 501 indicates "valid" at step S701, the valid signal 251 is validated. Further, when the matching between node IDs has been detected at step S702, the CPU of the communication unit 102 inputs an input packet determination signal indicating node ID matching into the determination unit 304. At the same time, at step S703, when the matching between the counter values has been detected, a count value matching signal is respectively inputted from the comparison unit 303 into the determination unit 304. At this time, the data of the packet is outputted from the output line 252 to the data processing unit 103.

When the respective detection operations are successful at step S701 to S703, the process proceeds to step S704. At step S704, the determination unit 304 determines whether or not the data processing unit 103 can input the data from the input packet determination signal, the count value matching signal and a stall signal 253 from the connected data processing unit 103. When the input packet determination signal and the count value matching signal are inputted and the stall signal 253 from the connected data processing unit 103 indicates "unstalled", the data can be inputted. When it is determined that the data can be inputted, then at step S706, the CPU of the communication unit 102 notifies the buffer 202 of data input via the signal line 260. Then, the CPU of the communication unit 102 clears VALID flag and the stall flag of the packet stored in the buffer 202 thereby invalidates the packet. The invalidated normal packet is used as a normal packet for data transmission after selection of No at step S808 in the operation flow of the transmission unit in FIG. 8. Further, at step S707, the data is inputted into the data processing unit 103. At this time, the data input notification signal is also inputted into the counter 302. Then at step S708, in the next clock cycle, the count value of the counter 302 is incremented (+1), and the process ends.

On the other hand, when the CPU of the communication unit 102 determines that the data cannot be inputted at step S704, then at step S705, the CPU of the communication unit 102 notifies the buffer 202 of data stall via the signal line 260. Then, the stall flag of the packet stored in the buffer 202 is set, and the process ends. The data that has not been inputted at step S705 is circulated on the ring bus waiting for the next reception.

When the CPU of the communication unit 102 detects mismatching between the node IDs at step S702, the CPU of the communication unit 102 determines that the packet is not transmitted for its processing module, and terminates the processing. Further, when mismatching between the counter values is detected at step S703, it is determined that the packet is an input subject packet but there is mismatching between data input orders. In this case, as the data cannot be inputted, the CPU of the communication unit 102 circulates the data that has not been inputted in this processing on the ring bus at step S705.

When the comparison unit 303 detects that the VALID flag 501 of the packet indicates "invalid" at step S701, then the comparison unit 303 examines the stalled status of the stall flag 502 at step S709. When the stall flag 502 indicates "unstalled", the CPU of the communication unit 102 determines that the packet is an invalid normal packet (empty packet), and terminates the process. When the stall flag 502 indicates "stalled", the CPU of the communication unit 102 determines that the packet is a special packet, and continues the processing at step S710 and subsequent steps.

At step S710, the CPU of the communication unit 102 examines whether or not the node ID 504 of the packet is "0" using the determination unit 304. When the node ID 504 is "0", the CPU of the communication unit 102 determines that the packet is an invalid special packet (empty packet), and terminates the process. When the node ID 504 is equal to or higher than "0", the CPU of the communication unit 102 continues the processing at step S711 and subsequent steps.

At step S711, the CPU of the communication unit 102 examines whether or not the node ID 504 of the packet matches the node ID stored in the register 301 using the determination unit 304. When the node IDs do not match each other, the CPU of the communication unit 102 determines that the packet is a packet for other destination than it processing module, and terminates the process. When the node IDs match each other, the CPU of the communication unit 102 determines that the packet is a packet for its processing module, and performs the processing at step S712 and the subsequent steps. Note that when the matching between the node IDs is detected at step S711, the input packet determination signal indicating the matching between the node IDs is inputted from the comparison unit 303 into the determination unit 304.

At step S712, the CPU of the communication unit 102 examines whether or not the value of the count 503 of the packet is "0" using the determination unit 304. When the value of the count 503 is "0", the CPU of the communication unit 102 determines that the packet is a packet for data transfer using a special packet for its processing module, and at step S713, notifies the buffer 202 of data input via the signal line 260. Further, the node ID 504 of the packet stored in the buffer 202 is cleared to "0" thereby the packet is invalidated. Further, the process ends after the data input at step S706 and the subsequent steps. Note that at this time, the count value matching signal is inputted from the comparison unit 303 into the determination unit 304, and the stall signal 253 from the data processing unit 103 becomes in an unstalled status.

On the other hand, at step S712, when the value of the count 503 of the packet is "1" or higher, the packet is a special inquiry packet for the present processing module. Accordingly, hereinafter, response processing with respect to the special inquiry packet is performed. In this processing, at first, at step S714, to confirm the processing order, the CPU of the communication unit 102 examines whether or not the value of the count 503 of the packet matches the value of the counter 302 using the determination unit 304. When the count values match each other, the processing order is correct, and the processing at step S715 and the subsequent steps is performed. Note that at this time, the count value-matching signal is also inputted from the comparison unit 303 into the determination unit 304.

At step S715, the CPU of the communication unit 102 determines whether or not the packet in the turn inquired from the determination unit 304 can be inputted. The method for determination is the same as that at step S704. Accordingly, when the stall signal 253 from the data processing unit 103 indicates "unstalled", data input is possible, and the packet without any processing, indicative of receivability in response to the inquiry, is returned to the ring bus. When the stall signal 253 from the data processing unit 103 indicates "stalled", data reception is impossible. In this case, at step S716, the node ID 504 of the packet stored via the signal line 260 into the buffer 202 is cleared to "0", thereby the special inquiry packet is invalidated, then a special empty packet is generated, and the process ends. Note that even when the value of the count 503 of the packet does not match the value of the counter 302 at step S714, reception is impossible to the inquiry. Accordingly, at step S716, the special inquiry packet is invalidated.

Figure 4:
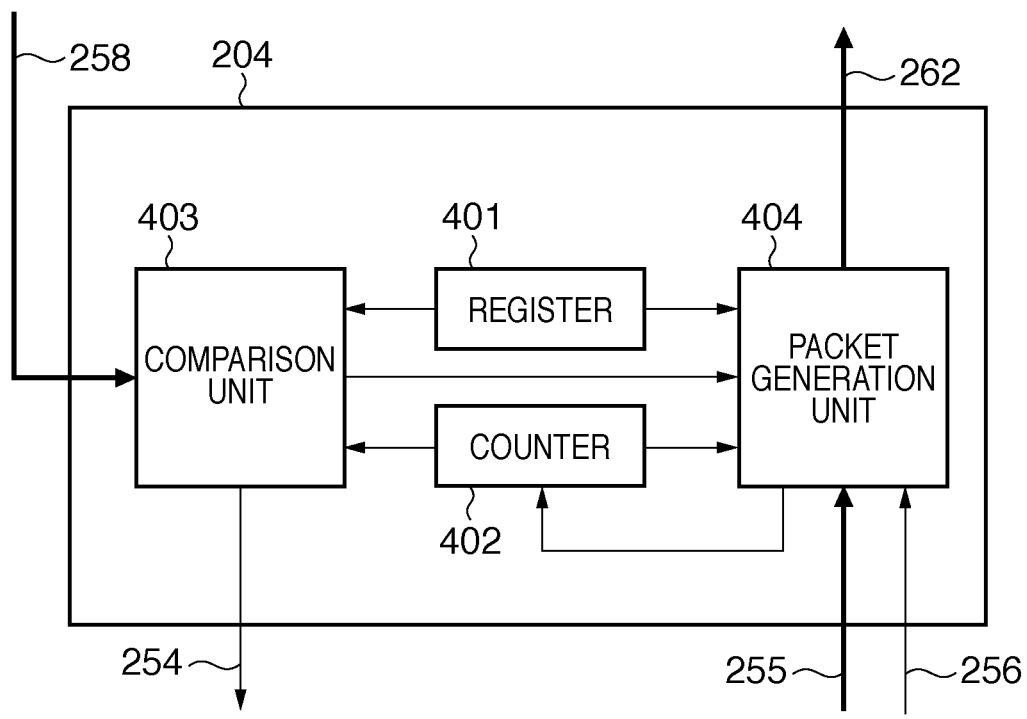
FIG. 4 is a block diagram showing a configuration of a transmission unit.

FIG. 4 is a block diagram showing a configuration of the transmission unit 204. In the figure, a register 401 has a value of the node ID of a processing module to perform the next processing, and a counter 402, a processing count value of the processing module in the next processing. The comparison unit 403 compares an output from the buffer 202 with the values of the register 401 and the counter 402. A packet generation unit 404 packetizes data processed by the data processing unit 103.

Figure 8:
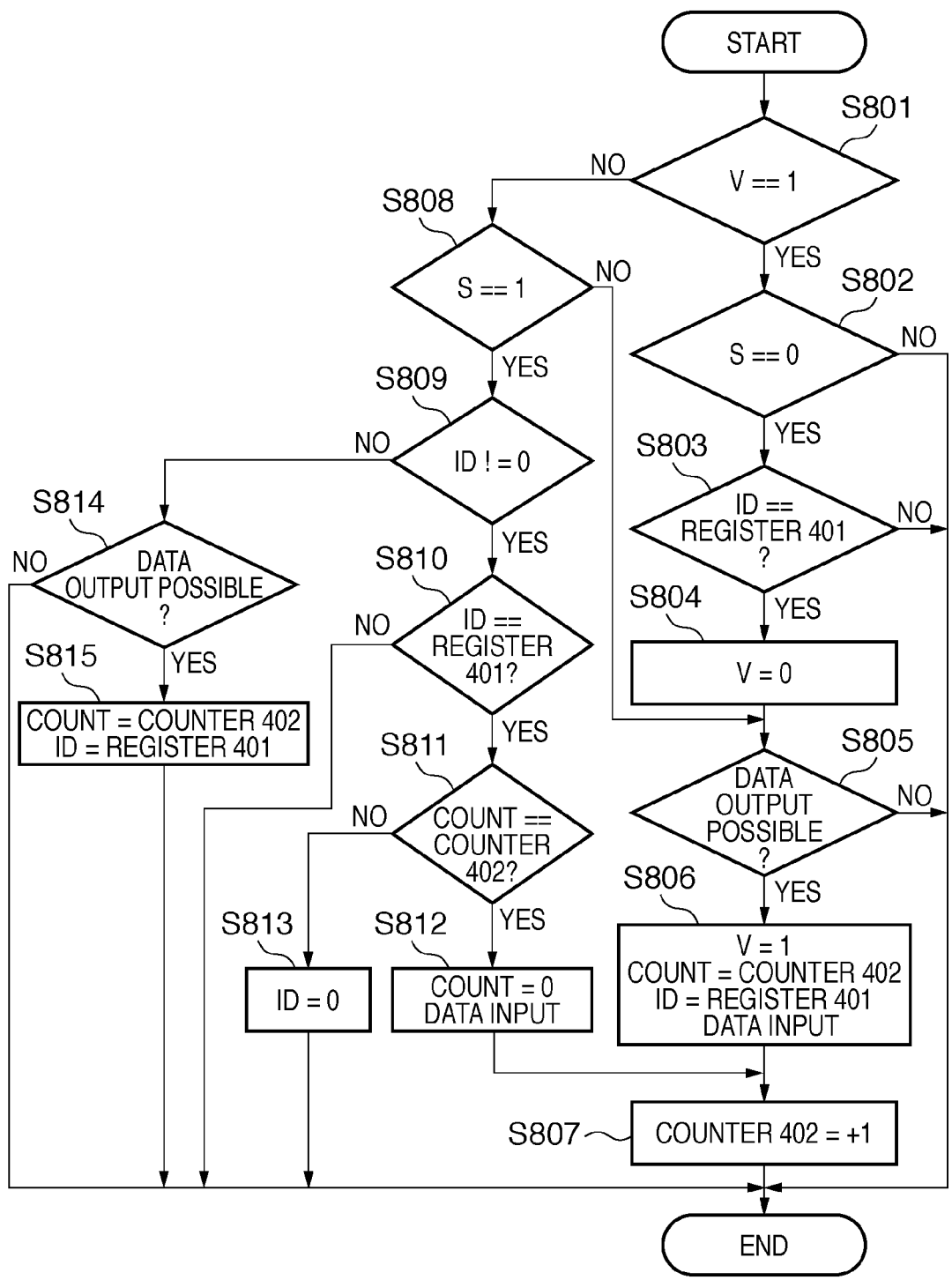
FIG. 8 is a flowchart showing an operation procedure of the transmission unit.

FIG. 8 is a flowchart showing an operation procedure of the transmission unit 204. The comparison unit 403 monitors the VALID flag 501, the stall flag 502, the count 503 and the node ID 504 of an output packet (signal line 258) in the buffer 202.

Then, at step S801, the CPU of the communication unit 102 detects that the VALID flag 501 of the packet indicates "valid". At step S802, the CPU of the communication unit 102 detects that the stall flag 502 of the packet indicates "unstalled", and at step S803, detects that the node ID 504 matches the node ID stored in the register 401. Note that when it is detected at step S801 that the VALID flag 501 indicates "valid", as the packet is being used, the data from the data processing unit 103 cannot be outputted onto the ring bus. Accordingly, to stall the data output from the connected data processing unit 103, the stall signal 254 is set. Further, at step S802, when matching between the node IDs is detected, an input packet determination signal indicating the matching between the node IDs is inputted from the comparison unit 403 into the packet generation unit 404.

When the CPU of the communication unit 102 succeeds in the respective detection operations at steps S801 to S803, the data transfer packet using a normal packet, circulated on the ring bus in the past for the next processing, has been returned without being received nor stalled. That is, since there is no receiver of the packet on the ring for some reason, the packet is deleted (empty-packetized) at step S804. For this processing, the comparison unit 403 controls the selector 203 via the packet generation unit 404 to clear the VALID flag 501 thereby invalidates the packet. As the data transfer from the packet generation unit 404 becomes possible, the comparison unit 403 clears the stall signal 254 so as to release the stalled status of data output from the connected data processing unit 103.

Then, at the next step S805, the CPU of the communication unit 102 determines whether or not the invalid (empty) normal packet is to be utilized for normal data transfer by its processing module. The packet generation unit 404 refers to the VALID signal 256 for the connected data processing unit 103. When the packet generation unit 404 determines that data output from the data processing unit 103 is possible, i.e., the VALID signal 256 indicates "valid", then at step S806, a data packet where the VALID flag 501 indicating "valid", the stall flag 502 indicating "unstalled", the count 503 having the count value of the counter 402, and the node ID 504 having the node ID of the register 401 are added is generated. Then, the CPU of the communication unit 102 controls the selector 203 to output the generated packet from the output terminal 259 on the ring bus. Further, in the next clock cycle, the count value of the counter 402 is incremented (+1) at step S807.

When it is detected at step S802 that the stall flag 502 of the packet indicates "stalled", the packet is a data transfer packet using a normal packet to the present module or another module and the packet indicates "stalled". In this case, since this packet cannot be used, the process ends. Further, when node ID mismatching is detected at step S803, as the packet is a data transfer packet using a normal packet for the present module, and this packet cannot be used, the process ends. Further, when the CPU of the communication unit 102 determines at step S805 that there is no data output from the data processing unit 103, processing cannot be performed. Accordingly, the selector 203 is controlled so as to output an empty normal packet from the output terminal 259 onto the ring bus.

When the comparison unit 403 detects at step S801 that the VALID flag 501 of the packet indicates "invalid", the CPU of the communication unit 102 clears the stall signal 254 so as to enable data output from the connected data processing unit 103, and examines the stalled status of the stall flag 502 of the packet at step S808. When the stall flag 502 indicates "unstalled", it is determined that the packet is an invalid normal packet (empty packet), and data output processing at step S805 and the subsequent steps is continued. When the stall flag 502 indicates "stalled", it is determined that the packet is a special packet, and processing at step S809 and the subsequent steps is continued.

At step S809, the CPU of the communication unit 102 examines whether or not the node ID 504 of the packet is "0". When the node ID 504 is "0", the CPU of the communication unit 102 determines that the packet is an invalid special empty packet, and continues processing at step S814 and the subsequent steps for inquiry about receivability to be described later. When the node ID 504 is "1" or higher, the CPU of the communication unit 102 continues processing at step S810 and the subsequent steps.

At step S810, the CPU of the communication unit 102 examines whether or not the node ID 504 of the packet matches the node ID stored in the register 401. When the node IDs do not match each other, the CPU of the communication unit 102 determines that the packet is a packet for other module than its module, and terminates the process. When the node IDs correspond with each other, the CPU of the communication unit 102 determines that the packet indicates that a special inquiry packet outputted from its module onto the ring bus has been received, and continues processing at step S811 and the subsequent steps. Note that when it is detected at step S810 that the node IDs match each other, an input packet determination signal indicating that the node ID matching is inputted from the comparison unit 403 into the packet generation unit 404.

At step S811, the CPU of the communication unit 102 examines whether or not the value of the count 503 of the packet matches the value of the counter 402. When the count values correspond with each other, since data regarding which the inquiry has been made using the special inquiry packet has not been outputted, a special data transfer packet is generated utilizing this packet. Upon generation of this packet, the value of the count 503 of the packet used in the inquiry is set to "0", and data to be processed by the next processing module is set in the data frame 505. Then, the selector 203 is controlled so as to output the generated special data transfer packet from the output terminal 259 onto the ring bus. Thereafter, step S807 is performed in the next clock cycle. When it is determined at step S811 that the count 503 of the packet does not match the value of the counter 402, it is determined that the data regarding which the inquiry has been made using the packet has been outputted during the inquiry using another packet. Accordingly, at step S813, the comparison unit 403 controls the selector 203 via the packet generation unit 404 to clear the node ID 504 to "0" thereby invalidates the packet. The invalidated special packet is returned to the ring bus and received by an arbitrary processing module.

When it is determined at step S809 that the node ID 504 of the packet is "0", the packet is an invalid special empty packet. Accordingly, transmission processing is performed hereinbelow to transmit an inquiry packet about receivability of a processing module to perform the next processing using this packet. For this processing, at first, at step S814, the CPU of the communication unit 102 examines whether or not data output is possible as in the case of step S805. As a result, when it is determined that data output is possible, a special inquiry packet where the VALID flag 501 indicating "invalid", the stall flag 502 indicating "stalled", the cont 503 having the value of the counter 402, and the node ID 504 having the node ID set in the register 401 are added is generated at step S815. Then, the selector 203 is controlled so as to output the generated inquiry packet from the output terminal 259 onto the ring bus. Note that in this case, since data to be processed is not actually sent, the value of the counter 402 is not changed. On the other hand, when there is no data output at step S814, a special inquiry packet is not generated, and the process ends.

Figure 9:
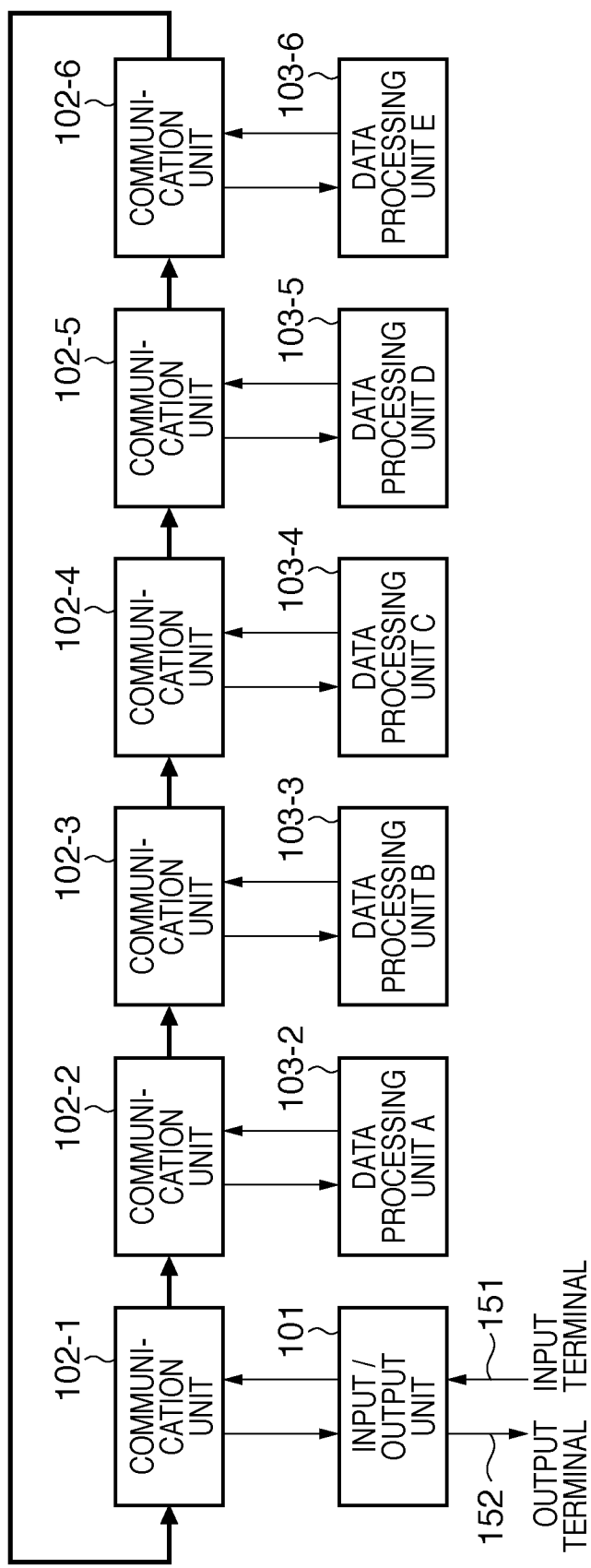
FIG. 9 is a block diagram showing a configuration of the data processing unit having five data processing units.

FIG. 9 is a block diagram showing a configuration of the data processing system having a ring bus where five data processing units are provided. As shown in the figure, in the respective data processing units 103-2 to 103-6, processing indicated with respective processing units A to E are performed on input data. The order of the data processing unit 103-2 to 103-6 is arbitrarily set, however, the result of final processing appears at the output terminal 152 of the input/output unit 101. As the final output is always waiting for data, in other words, it is receivable, data transfer established between the communication unit of the final data processing unit and the communication unit 102-1 of the input/output unit 101 is always assured. Assuming that processing is performed in the processing unit A, then in the processing unit C, then in the processing unit E, then in the processing unit D and in the processing unit B, as the order of processing in FIG. 9, the processed output from the communication unit 102-3 of the processing unit B is always received by the communication unit 102-1 of the input/output unit 101. Accordingly, when at least one special packet (special empty packet) exists, data transfer between the communication unit 102-3 and the communication unit 102-1 is assured regardless of situations of other normal packets. Accordingly, all the processing results from the processing unit B outputted onto the ring bus are always outputted through the output unit 101 to the outside of the ring bus. As a result, the processing unit B becomes capable of receiving the next data from the processing unit D, and at this time, as at least one special packet exists, data transfer between the communication unit 102-5 and the communication unit 102-3 is assured regardless of situations of other normal packets. That is, infallible data transfer can be performed using the special inquiry packet and special data transfer packet. That is, on the ring bus where at least one special packet exists, a data processing unit where processing is suspended since input data is stopped can be found, and data can be sequentially sent to such processing unit. Accordingly, even upon data transfer in arrears between communication units, data processing can be infallibly performed, and deadlock condition can be avoided.

Figure 10:
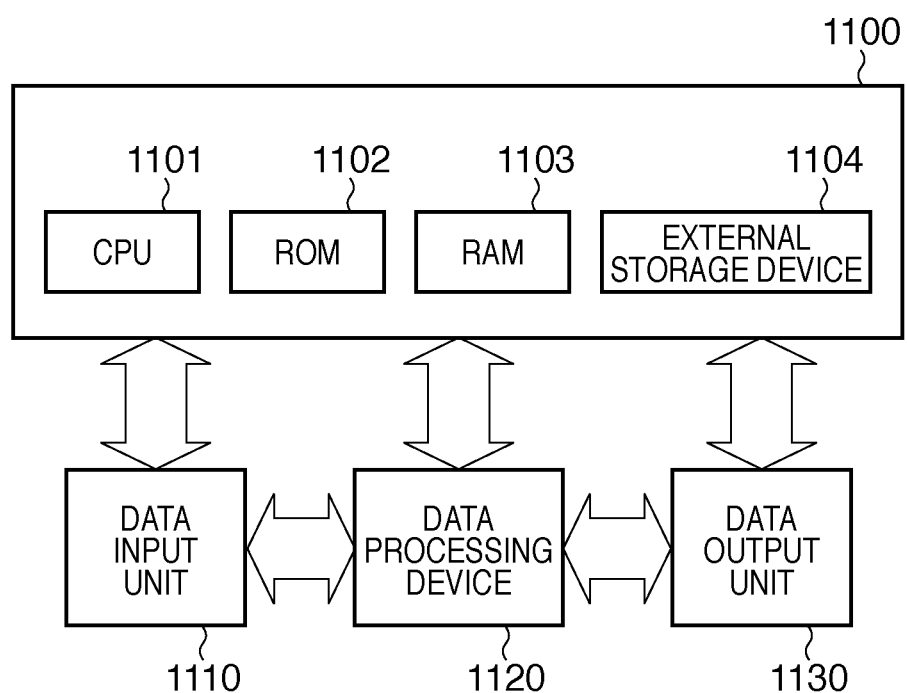
FIG. 10 is a block diagram showing a configuration of a system having the data processing unit.

In another embodiment, an application of the data processing unit utilizing a ring bus shown in the embodiment 1 incorporated in the entire system will be described. FIG. 10 is a block diagram showing a configuration of the entire system including the data processing unit.

A system control unit 1100 which is a so-called computer has a CPU 1101 for arithmetical operation and control, a ROM 1102 for storing fixed data and programs, a RAM 1103 used for temporary data storage and program loading, an external storage device 1104 for storing external data and the like.

The CPU 1101 also functions as a data input unit to input data to be processed from the outside of the system. For example, the CPU 1101 may be an image reading device having an image scanner, an A/D converter and the like, or may be a voice input device having a microphone, an A/D converter and the like.

A data processing unit 1120 performs data processing via the ring bus in the present embodiment. A data output unit 1130 outputs data processed in the present system to the outside. For example, the data processing unit 1120 may be an image output device including a printer device which converts image data into a print dot pattern and print-outputs the converted data or may be a voice output device which outputs voice data through a D/A converter or the like.

Data inputted by a data input unit 1110 may be sent to the system control unit 1100 and processed by the CPU 1101, or may be temporarily stored in the RAM 1103 or the external storage device 1104. Accordingly, the data processing unit 1120 may directly receive the input data from the data input unit 1110 and perform processing on the received data, or may perform processing on data supplied from the system control unit 1100 in accordance with an instruction from the system control unit 1100. Further, the output from the data processing unit 1120 may be again sent to the system control unit 1100 or may be directly sent to the data output unit 1130.

In the data processing unit 1120, processings for various data are set, and various data to be processed are supplied to the data processing unit 1120 under the control of the system control unit 1100. The data processing unit 1120 performs processing in correspondence with the setting and outputs processed data to the outside.

[Operation Flow]

FIG. 11 is a flowchart showing a control procedure of the data processing unit to process data from the system control unit 1100. When control processing is started, the data processing system is reset at step S1210. At this time, the buffer 202, the register 301 in which a node ID is set, the register 401, the counter 302 indicating a data processing order, the counter 402, a counter increment register (not shown), a packet invalidation setting register, and the like, constructing the ring bus, are initialized. Note that in the present embodiment, for identification of a special packet, the value "0" of the node ID and the counter value is utilized. Accordingly, the value of the node ID is "1" or higher, and the initial values of the respective counters are "1".

At step S1220, the register 301 holding the node ID of the communication unit 102 and the register 401 are set. Further, the counter 302 indicating the data processing order, the initial value of the counter 402, an increment register and packet invalidation setting register and the like are set in accordance with necessity. At step S1230, parameter designation and the like for the data processing unit 103 are performed, and at step S1240, an instruction to start the data processing system is made.

At step S1250, processing to monitor notification of completion in the data processing unit is performed. This step is repeated until the detection of the completion of processing has been determined at step S1260. When the notification of completion in the data processing unit is confirmed at step S1260, the process ends.

As described above, it is apparent that when the data processing unit described in the embodiment 1 is incorporated in a system having a broad range of applications, a deadlock condition in data processing can be avoided. The data processing unit in the system is provided with data to be processed which is circulated on the ring bus in the apparatus and at least one special data packet. When an arbitrary processing module receives the special packet, a special inquiry packet is generated, and it is confirmed that the data packet can be infallibly transferred between the processing modules, then the data to be processed is infallibly transferred with a special data transfer packet. Accordingly, as processing can be infallibly continued no matter how the ring bus is occupied with normal data packets, the processing can be continued without deadlock condition.

Further, the processing in the above-described respective embodiments may be realized by cooperation between plural hardware devices and software. In this case, the processing can be realized by performing software (program) obtained via a network or various storage media by a processing apparatus (CPU, a processor etc.) of a computer or the like. Further, the present invention may be realized by supplying a storage medium holding a program to realize the functions of the above-described embodiments by a computer to a system or an apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-118043, filed May 14, 2009, which is hereby incorporated by reference herein in its entirety.

What is claimed is:

1. A data processing system comprising:
a ring bus;
a plurality of data apparatuses, connected to said ring bus, for mutually exchanging data using a packet circulated on said ring bus; and
an injection unit for injecting a special packet, distinguished from the packet, onto said ring bus so as to circulate the special packet on said ring bus,
wherein each of said plurality of data apparatuses comprises:
a confirming unit for confirming whether or not a data apparatus being a transmission destination of the data is capable of receiving data by circulating the special packet from a data apparatus being a transmission origin of the data back to the transmission origin when the special packet in an empty status is obtained; and
a transmission unit for transmitting the data to the transmission destination using said special packet when said confirming unit determines that the transmission destination is capable of receiving data.

2. The data processing system according to claim 1, wherein said confirming unit comprises:
a unit for returning an inquiry packet without any change onto said ring bus when the transmission destination is capable of receiving data upon reception of the inquiry packet; and
a unit for changing the inquiry packet to the special packet in an empty status and transmitting the special packet to said ring bus when the transmission destination is not capable of receiving data upon reception of the inquiry packet, and
wherein said transmission unit comprises:
a unit for transmitting the special packet as an inquiry packet from the transmission origin to the transmission destination; and
a unit for determining that the data apparatus being the transmission destination is capable of receiving data when the transmission origin receives the inquiry packet which was transmitted to the transmission destination through said ring bus.

3. The data processing system according to claim 1, further comprising an input/output unit to input/output data from/to outside.

4. A data processing system comprising:
a token ring bus;
a plurality of data apparatuses connected to said token ring bus, for mutually exchanging data exchange using a packet circulated on said token ring bus; and
an injection unit for injecting a special packet, distinguished from the packet, onto said token ring bus so as to circulate the special packet on said token ring bus,
wherein each of said plurality of data apparatuses comprises:
a confirming unit for confirming whether or not a data apparatus being the transmission destination of the data is capable of receiving data by circulating the special packet from a data apparatus being a transmission origin of the data back to the transmission origin when the special packet in an empty status is obtained; and
a transmission unit for transmitting the data to the transmission destination using said special packet when said confirming unit determines that the transmission destination is capable of receiving data.

5. A data processing method using a ring bus and a plurality of data apparatuses connected to the ring bus to mutually exchange data using a packet circulated on said ring bus, comprising the steps of:
injecting a special packet, distinguished from the packet, onto the ring bus so as to circulate the special packet on the ring bus;
confirming whether or not a data apparatus being a transmission destination the data is capable of receiving data circulating the special packet from a data apparatus being a transmission origin of the data back to the transmission origin when the plurality of data apparatuses respectively obtain the special packet in an empty status; and
transmitting the data to the transmission destination using the special packet when the plurality of data apparatuses respectively determine that the transmission destination is capable of receiving data.

6. A non-transitory computer-readable storage medium storing an executable program for causing a computer to execute a method using a ring bus and a plurality of data apparatuses connected to the ring bus to mutually exchange data using a packet circulated on said ring bus, said method comprising:
injecting a special packet, distinguished from the packet, onto the ring bus so as to circulate the special packet on the ring bus;
confirming whether or not a data apparatus being a transmission destination of the data is capable of receiving data by circulating the special packet from the data apparatus being a transmission origin of the data back to the transmission origin when the plurality of data apparatuses respectively obtain the special packet in an empty status; and
transmitting the data to the transmission destination using the special packet when the plurality of data apparatuses respectively determine that the transmission destination is capable of receiving data.

* * * * *